United States Patent [19]
Saillard

[11] 3,743,937
[45] July 3, 1973

[54] INSTALLATION FOR SUCCESSIVELY TRANSMITTING A CALL SIGNAL FROM A PLURALITY OF TRANSMITTERS IN TURN

[75] Inventor: Pierre Saillard, Saint-Leu-D'Esserent, France

[73] Assignee: Charbonnager De France, Paris, France

[22] Filed: Oct. 5, 1971

[21] Appl. No.: 186,670

[30] Foreign Application Priority Data

Oct. 14, 1970 France .............................. 7037175

[52] U.S. Cl. ........................ 325/55, 325/1, 325/51, 325/53, 325/64, 325/166, 325/186, 325/187, 343/227

[51] Int. Cl. .............................................. H04b 1/00

[58] Field of Search ................................ 325/53–55, 51, 52, 4, 184, 2, 6, 9, 11, 13, 14, 166, 169, 186, 64, 187, 1; 343/180, 228, 227; 340/186, 211; 179/170 R

[56] References Cited

UNITED STATES PATENTS

| | | | |
|---|---|---|---|
| 2,487,513 | 11/1949 | Beverage | 325/9 |
| 3,086,080 | 4/1963 | Raisbeck | 325/13 |
| 3,030,446 | 4/1962 | Briggs | 325/53 |
| 2,517,891 | 8/1950 | Laeser | 325/11 |

*Primary Examiner*—Albert J. Mayer
*Attorney*—Karl W. Flocks

[57] ABSTRACT

A central call station is connected to a plurality of transmitters successively triggered to transmit a high frequency call signal for a predetermined time with each transmitter triggered by the preceding transmitter through connecting wires.

12 Claims, 8 Drawing Figures

INVENTOR
PIERRE SAILLARD

BY Karl W. Flocks
ATTORNEY

*INVENTOR*
PIERRE SAILLARD

*BY* Karl W. Flocks
*ATTORNEY*

INSTALLATION FOR SUCCESSIVELY TRANSMITTING A CALL SIGNAL FROM A PLURALITY OF TRANSMITTERS IN TURN

BACKGROUND OF THE INVENTION

The present invention relates to installations which make it possible, from a central call station, to attract the attention of a person by means of high frequency radio call signals (or HF call signals) received and converted into acoustic or light signals by a receiver carried by the person to be called.

In order to call a person who has to move within a wide space or along long, ramified paths, it has already been proposed to effect the transmission of HF call signals not by means of a single high power transmitter installed at the central call station, but by means of a plurality of low power peripheral transmitters distributed over the space within which the person to be called moves, the useful ranges of these transmitters overlapping and the effective operation of the peripheral transmitters being triggered by means of control signals transmitted from the central station to the peripheral stations either by wire or by radio.

In installations of this kind, it is advantageous to use a single high call frequency to which the peripheral call stations and the receiver are tuned.

In order to avoid interference occurring in the zone of overlap of the useful ranges of two contiguous transmitters, when the latter are transmitting simultaneously, it has already been proposed to cause the peripheral call stations to transmit successively and cyclically, each of them transmitting for a short period as the result of controlled signals transmitted by radio by the central call station. Installations of this kind require a high powered control signal transmitter installed at the central call station and must contain a control signal coding device at the central station and a decoding device in each peripheral call station, whereby the complexity and the cost of these installations are increased.

SUMMARY OF THE INVENTION

The present invention has as its object a simple installation for calling persons by means of a single high frequency transmitted by peripheral call stations operating successively and cyclically, which does not require either a control signal transmitter or switching signal coding and decoding devices.

The radio call installation according to the invention is characterized by the fact that the operation of the transmitter of order $n$ is triggered for a predetermined time $t$, by a triggering signal transmitted by the transmitter of order $(n-1)$ at a moment such that the transmitter of order $n$ starts to transmit when the transmitter of order $(n-1)$ has ceased to transmit, the triggering signal being transmitted to the transmitter of order $n$ by wire.

In a preferred variant the triggering signal is transmitted by the transmitter of order $(n-1)$ at the moment when that transmitter ceases to transmit.

BRIEF DESCRIPTION OF THE DRAWINGS

Other characteristics and advantages of the present invention will be clear from the following description, which is given with reference to the accompanying drawings, in which.

DESCRIPTION OF THE PREFERRED EMBODIMENTS

Figures 1, 2, 3:
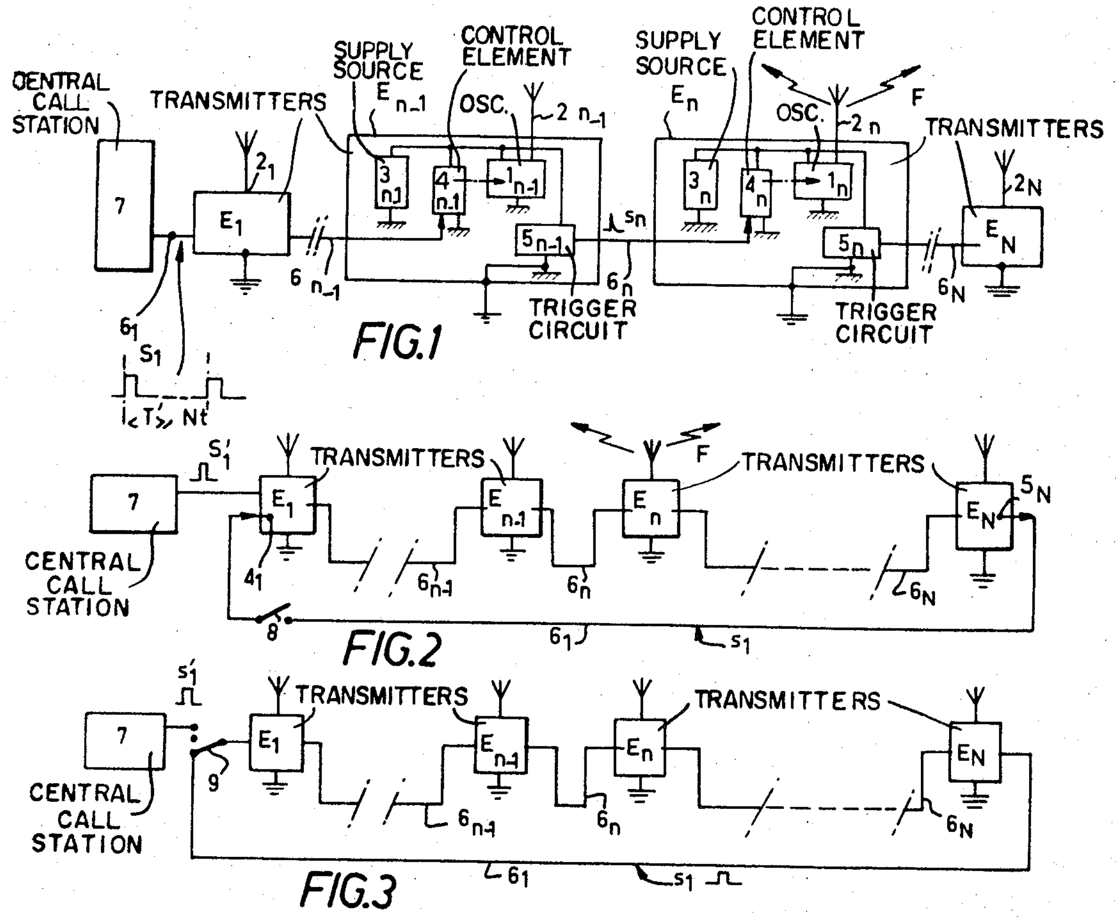
FIG. 1 is the basic diagram of a call installation according to the invention.
FIG. 2 is the basic diagram of an alternative embodiment.
FIG. 3 is the basic diagram of an advantageous form of construction of the installation illustrated in FIG. 2.

FIG. 1 shows the basic diagram of the radio call system with a single call frequency F according to the invention.

This installation comprises a certain number N of transmitters $E_1, E_2 \ldots E_n \ldots E_N$, each containing an oscillator 1 tuned to the common call frequency F, a transmission aerial 2, and a supply source 3. The frames of all the transmitters are connected to earth.

The transmitters are so designed that at normal times they do not transmit the call frequency. According to the present invention the effective transmission of the call frequency F by the transmitter $E_n$ is brought about and maintained for a predetermined transmission time $t$ by means of a control element $4_n$, the operation of which is triggered by a triggering signal $s_n$ produced by a trigger circuit $5_{(n-1)}$ contained in the transmitter $E_{(n-1)}$ and transmitted to the control element $4_n$ by means of a connecting conductor $6_n$.

The signal $s_n$ should preferably be produced at a moment such that it triggers the effective transmission of the call frequency F by the transmitter $E_n$ only when the transmitter $E_{(n-1)}$ has ceased to transmit. In an advantageous version the triggering signal is emitted and transmitted at a moment when the transmitter $E_{(n-1)}$ ceases to transmit.

Starting from the moment when the first transmitter $E_1$ starts to transmit the different transmitters operate successively during short times $t$, each of them being triggered by the preceding transmitter, and the last transmitter ceases to transmit at the end of the time $t$ equal to the sum of the transmission times $t$ of the N transmitters constituting the network.

The repetition of a call cycle may be brought about by the periodic triggering of the first transmitter by means of controlled signals $S_1$ supplied by a central call station 7 with a recurrence period T' at least equal to the period $T = Nt$.

FIG. 2 illustrates an alternative construction of the call system according to the invention. In this alternative embodiment the trigger circuit $5_N$ of the last transmitter $E_N$ is connected to the control element $4_1$ of the first transmitter by means of a loop conductor $6_1$ and of a switch element 8, the conductor and switch element being in series. Starting from the moment when the operation of the first transmitter $E_1$ is triggered by a single initiating control signal $S'_1$ supplied by a central call station 7, the call cycle is repeated automatically in this installation through the periodic automatic triggering of the first transmitter $E_1$ by the control signal $s_1$ supplied by the trigger circuit $5_N$ of the last transmitter $E_N$, as long as the switch 8 remains closed. The stopping of the repeating of the call is effected by the opening of the switch element 8.

The momentary coupling of the central call station 7 and the control element of the transmitter $E_1$ and the permanent coupling of the connecting conductor $6_1$ and of the same transmitter $E_1$ may advantageously be effected by means of a reversing switch element 9, as illustrated in FIG. 3.

In the two installations which have just been described schematically, it can be seen that the different transmitters operate successively for short periods of time each of them being triggered by the preceding transmitter, and first being optionally triggered by an auxiliary central call station. A transmission is therefore propagated along the entire call network, the phenomenon being repeated either spontaneously in the case of FIGS. 2 and 3, or with the recurrence rate T' given by the central call station in the case of FIG. 1. The person to be called, who carries a receiver tuned to the call frequency, therefore receives, when he is situated in a determined position in the call network, a succession of call signals, transmitted by the transmitter nearest to the position where he is situated and repeated with the recurrence rate of th operating period of that transmitter.

Figure 5:
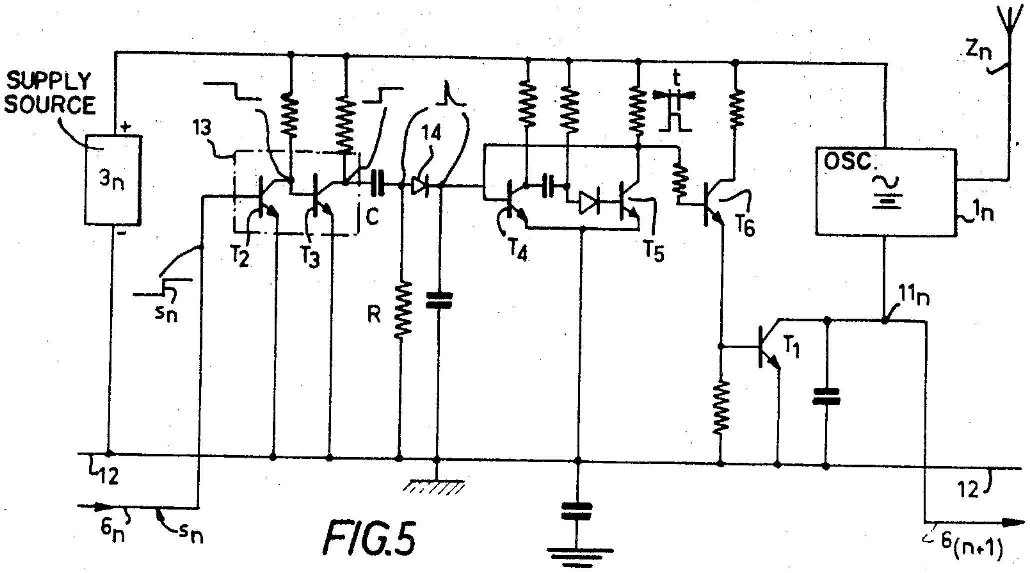
FIG. 5 is the basic diagram of an advantageous form of construction of these transmitters.
Figure 4:
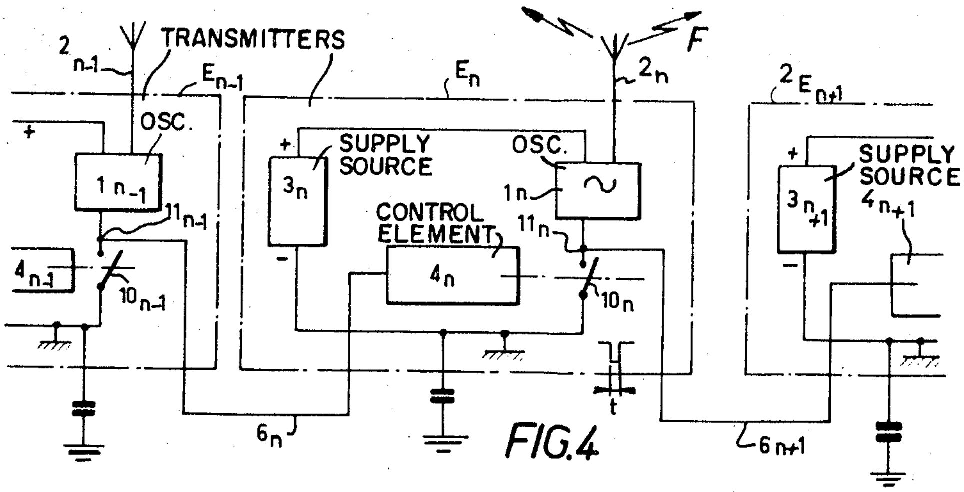
FIG. 4 is the basic diagram of a form of construction of the transmitters used in the call installation according to the invention.

FIG. 4 shows the functional diagram of a preferred form of construction of the transmitters which can be used in an installation according to the invention, while FIG. 5 is a basic diagram of a preferred form of construction thereof.

In the transmitter illustrated in these figures a normally open switch element $10_n$ is connected in series with the supply circuit of the oscillator $1_n$ and disposed between the latter and the earthed frame of the transmitter. The closing of the switch element $10_n$ during a predetermined time $t$ is controlled by the control element $4_n$. The high spot $11_n$ of the switch element of the transmitter $E_n$ is connected to the control element $4_{(n+1)}$ of the next transmitter $E_{(n+1)}$.

With a transmitter of this type, the transmission of the call frequency by each transmitter continues as long as the switch element $10_n$ remains closed, the high spot of the latter being at zero potential.

At the end of the time $t$, the switch element $10_n$ opens and the potential, relative to earth, of the high spot $11_n$ and of the connecting conductor $6_{(n+1)}$ rises. This rise in the potential of the connecting conductor in relation to earch constitutes the signal for the triggering of the operation of the transmitter $E_{(n+1)}$, the control element $4_{(n+1)}$ being designed to be sensitive to this variation of the potential of the connecting conductor, but insensitive to the opposite variation of this potential, which results from the closing of the switch element $4_n$ determining the effective transmission of the transmitter $E_n$.

In this embodiment, earth constitutes the reference potential point common to all the transmitters. As a precaution, in order to avoid the influences of the possible variations of earth potential at different points of the network, due for example to telluric currents, it may be advantageous for the frames of all the transmitters to be additionally connected by a common frame conductor 12, as illustrated in FIG. 5.

In the embodiment illustrated in this FIG. 5, the control element 4 is constituted by a main switching transistor $T_1$ which is normally in the non-conductive state and the emitter-collector circuit of which is connected in the convenient direction depending on the type of transistor (N P N in the case of the figure) in series with the supply circuit of a quartz stabilized oscillator 1.

The control element 4 illustrated comprises in succession: an input stage 13 constituted by an input transistor $T_2$ to the base of which is connected the connecting conductor $6_n$, coming from the preceding emitter, and which is normally in the non-conductive state when the connecting conductor is at zero potential, and an output transistor $T_3$ connected to the input transistor in such a manner that it is conductive when the input transistor is in the non-conductive state, and vice-versa; a differentiator RC circuit effecting differentiation of the variations of the potential of the collector of the transistor $T_3$; a detector circuit 14 allowing the passage only of the pulses supplied by the differentiator circuit and corresponding to the raise in potential of the connecting conductor; and a monostable multivibrator which is constructed around the transistors $T_4$, $T_5$ and the passage of which to the unstable state for the period of time T is triggered by the pulses transmitted by the detector circuit.

The voltage pulse available at the collector of the output transistor $T_5$ of the monostable multivibrator during the time $t$ of the unstable period of the latter is transmitted to the switching transistor $T_1$ by means of an amplifier transistor $T_6$ and results in the bringing of the transistor $T_1$ into the conductive state and the effective transmission of the call frequency by the corresponding transmitter during the time $t$ of the unstable period of the monostable multivibrator of the transmitter.

It should be noted that as long as the potential of the connecting conductor $6_n$ connecting the transmitter $E_n$ in question to the transmitter $E_{(n-1)}$ preceding it remains positive, the transistor $T_2$ will remain conductive. On the other hand, the switching element $10_{(n-1)}$ of the transmitter $E_{(n-1)}$ is closed and brings about the effective transmission of the call frequency by the transmitter $E_{(n-1)}$, the potential of the connecting conductor $6_n$ returns to zero which entails the return to the non-conductive state of the input transistor $T_2$ of the inverter stage of the transmitter $E_n$, the conduction of the transistor $T_3$ of the same stage, and the appearance of a negative voltage step at the collector of the transistor $T_3$. This negative step is differentiated by the differentiator RC stage, which transforms it into a negative pulse which is not transmitted by the detector circuit 14 to the monostable multivibrator $T_4$, $T_5$ of the transmitter $E_n$. It follows that this negative variation of the potential of the connecting conductor $6_n$ has no influence on the state of the transmitter $E_n$ and does not entail the transmission by the latter of the call frequency.

In an installation of this kind, the repetitive control signals of the first transmitter $E_1$ may be the signals $S_1$, supplied by a central call station, as in the installation illustrated in FIG. 1.

Figure 6:
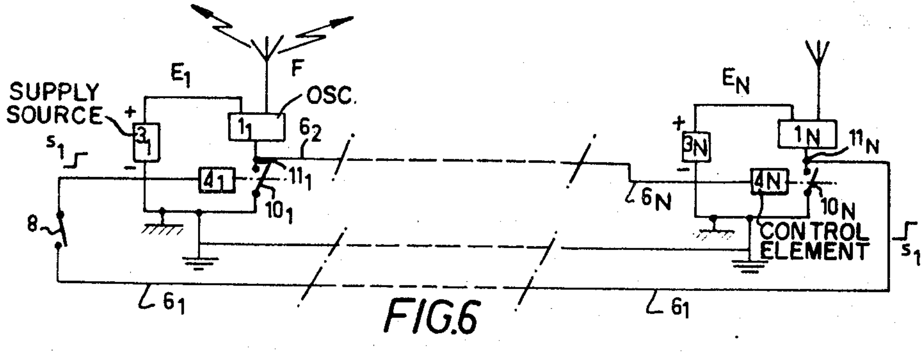
FIG. 6 is the basic diagram of an advantageous form of construction of the installation utilizing the transmitters illustrated in FIGS. 4 and 5.

FIG. 6 illustrates an advantageous alternative construction of the istallation illustrated in FIG. 5, wherein the central call station is eliminated. In this arrangement the high spot $11_N$ of the switch element of the last transmitter $E_N$ is connected to the iput stage of the trigger circuit of the first transmitter $E_1$ by means of the loop conductor $6_1$ of the switch 8, as was described in connection with FIG. 2. The simple closing of the switch 8 brings about the initial triggering of the operation of the first transmitter $E_1$ at the beginning of the first call cycle and the automatic repetition of the call cycle as long as this closure is maintained.

In the embodiments which have been described above and illustrated in FIGS. 1 to 6 each of the transmitters is supplied with a built-in supply source. In the advantageous embodiment illustrated in FIG. 7 the installation is supplied with a common supply source installed at the central call station, one of its terminals being connected simultaneously to all the transmitters by means of a common supply conductor 15, the other terminal being connected to earth.

Each transmitter is supplied with a current regulating circuit 17 effecting the charging of a capacitor 18. Normally the current regulator circuit supplies the different transistors which are in the conductive state, namely the transistor $T_3$ and the transistor $T_4$ but does not feed the oscillator 1 because the supply circuit of the latter is interrupted by the transistor $T_1$, which is in the non-conductive state. When this transistor becomes conductive the additional energy necessary for the operation of the oscillator is not supplied by the supply conductor 16 but by the capacitor 18, which becomes discharged. When the switching transistor $T_1$ returns to the non-conductive state, the current regulator circuit 17 effects the recharging of the capacitor 18. It follows that it becomes possible to limit the maximum intensity of the current circulating in the supply conductor 16 in order to make it compatible with safety requirements when the conditions of use or the place in which the call installation is used so require, as is the case in underground mine workings.

Figures 7, 8:
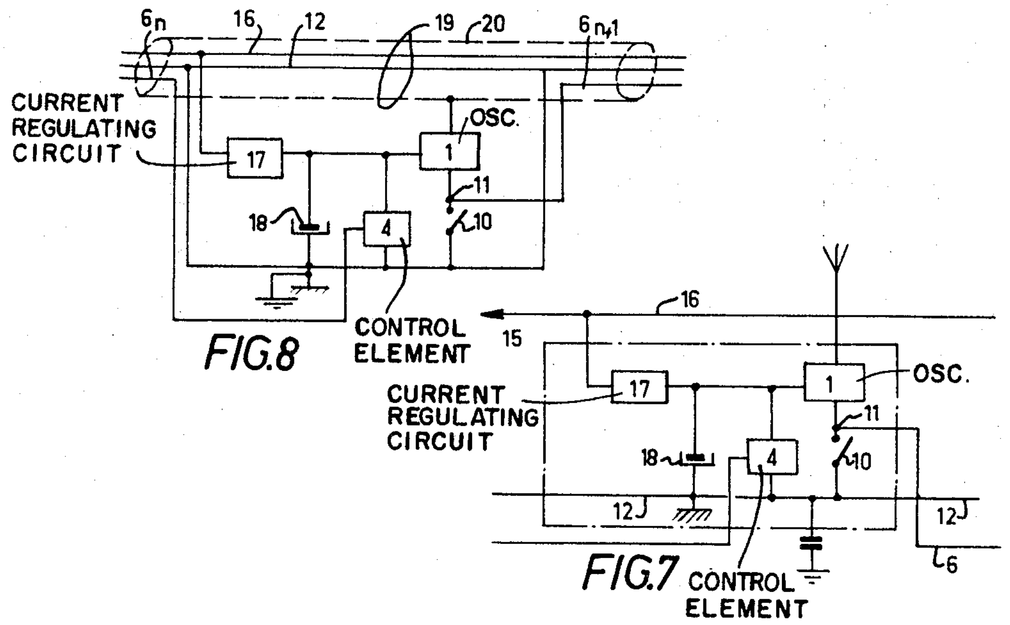
FIG. 7 is the basic diagram of an alternative form of feeding the transmitters.
FIG. 8 is the basic diagram of an alternative form of connection of the different transmitters in an installation according to FIG. 7.

In order to avoid the proliferation of cables along the call system, it may be advantageous for the common supply conductor 16, the common frame conductor 12, and all the connecting conductors 6 to be combined in a single multiconductor cable 19 suitably connected to each transmitter, and the screening 20 of this cable may then advantageously constitute an aerial common to all the transmitters (see FIG. 8).

From the description given above it can be seen that all the transmitters of an installation are of the same type and may be constructed in the form of identical modules, thereby making it possible for the cost price of the call installation to be reduced. Moreover, it is possible to add transmitters to an existing installation in order to increase its range, without it being necessary to modify the installation, thus providing excellent facilities for establishing and extending a call system.

It will be obvious to those skilled in the art that various changes may be made without departing from the scope of the invention and the invention is not to be considered limited to what is shown in the drawings and described in the specification.

What is claimed is:

1. An installation to call a person who is moving along a path and is equipped with a portable radio receiver by utilizing a single high frequency call signal comprising
- a plurality of transmitters distributed along the path and tuned to transmit successively on the same frequency;
- each of said transmitters including
  - generating and transmitting means to generate and transmit the call signal,
  - controlling means connected to said generating and transmitting means to allow the transmission of the call signal for a predetermined time,
  - triggering means connected to all said above mentioned means to send a triggering signal to said next successive one of said plurality of transmitters to trigger said next successive transmitter for transmission of the call signal upon cessation of transmissions from said above mentioned generating and transmitting means so that two succeeding transmitters transmit the call signal one after the other;
- wire connections carrying said triggering signals between said transmitters;
- and a means to trigger the transmission in a first one of said transmitters to initiate transmission in the installation.

2. An installation according to claim 1, further characterized by
- said wire connections including connection means connecting said triggering means from the last of said transmitters operating in succession to the first of said transmitters in the sequence of operation.

3. An installation according to claim 1, further characterized by
- said triggering signal of each of said transmitters is transmitted by said triggering means of that transmitter as soon as that said transmitter ceases to transmit the call signal.

4. An installation according to claim 1, further characterized by
- said means to trigger the transmission in a first one of said transmitters being a central call station having means to trigger the operation of said first of said transmitters in the sequence of operation with a signal having a recurrence period of a value at least equal to the sum of the operating times of all of said plurality of transmitters of the call system installation.

5. An installation according to claim 1 further characterized by
- said means to trigger the operation of said first of said transmitters transmitting a single signal from said central call station.

6. An installation according to claim 1, further characterized by
- each of said transmitters further including
- a voltage supply source,
- said generating and transmitting means including an oscillator connected to said supply source,
- and said controlling means including a normally open switch connected to said triggering means of the preceding transmitter in the sequence of operation of said transmitters.

7. An installation according to claim 6, further characterized by
- said wire connections including connection means connecting said triggering means from the last of said transmitters operating in succession to the first of said transmitters in the sequence of operation;
- said connection means including a conductor and a switch element connected in series between said normally open switch of said last of said transmitters operating in succession and said triggering means of said first of said transmitters in the sequence of operation.

8. An installation according to claim 1 further characterized by a common reference potential connection to all of said plurality of transmitters;

a supply source in each of said transmitters;

said generating and transmitting means in each of said transmitters including an oscillator connected to said supply source;

said triggering means including a normally open switch in each of said transmitters connected between said oscillator and said common reference potential connection;

said normally open switch having a point connected to a control means in the succeeding transmitter in the sequence of operation of said transmitters, said triggering means producing a triggering signal by the rise in potential in the attached said wire connection resulting from the opening of said normally open swtich.

9. An installation according to claim 1, further characterized by said triggering means including an input circuit having an input transistor connected to one of said wire connections coming from a preceding said transmitter, said input transistor being conductive when the potential of the connecting conductor is positive, and an output transistor connected to said input transistor which is conductive when said input transistor is non-conductive and vice versa, a differentiator circuit connected to said output transistor, a detector connected to said differentiator circuit permitting only the passage of the pulses supplied by said differentiator circuit and corresponding to the rise in potential of said wire connection, and a monostable multivibrator connected to said detector circuit, the change of which to the unstable state is triggered by the pulses transmitted by said detector circuit, said multivibrator effecting during its unstable period the closing of a normally open switch of said transmitter connected to said multivibrator by transmission of a pulse from said multivibrator to said switch.

10. An installation according to claim 1, further characterized by each of said transmitters including a self-contained supply source, 11. An installation according to claim 1, further characterized by said means to trigger the transmission in a first one of said transmitters including a central call station having a common supply source;

a common supply conductor connecting a terminal of said common supply source to all of said transistors, the other terminal of said supply source being connected to ground;

a capacitor in each of said transmitters connected on one hand to said common supply conductor through a current regulating circuit, and on the other hand to ground by a conductor connected to the frames of said transmitters.

12. An installation according to claim 11, further characterized by said common supply conductor, said common frame conductor, and wire connection between said transmitters included in a screened multiwire cable with said screening constituting an aerial common to all of said transmitters.

* * * * *

UNITED STATES PATENT OFFICE
CERTIFICATE OF CORRECTION

Patent No. 3,743,937 Dated July 3, 1973

Inventor(s) Pierre SAILLARD

It is certified that error appears in the above-identified patent and that said Letters Patent are hereby corrected as shown below:

Column 6, line 7, should read as follows:

triggering means connected to at least one of said above men-

Signed and sealed this 26th day of March 1974.

(SEAL)
Attest:

EDWARD M.FLETCHER,JR.
Attesting Officer

C. MARSHALL DANN
Commissioner of Patents